Figure 3:
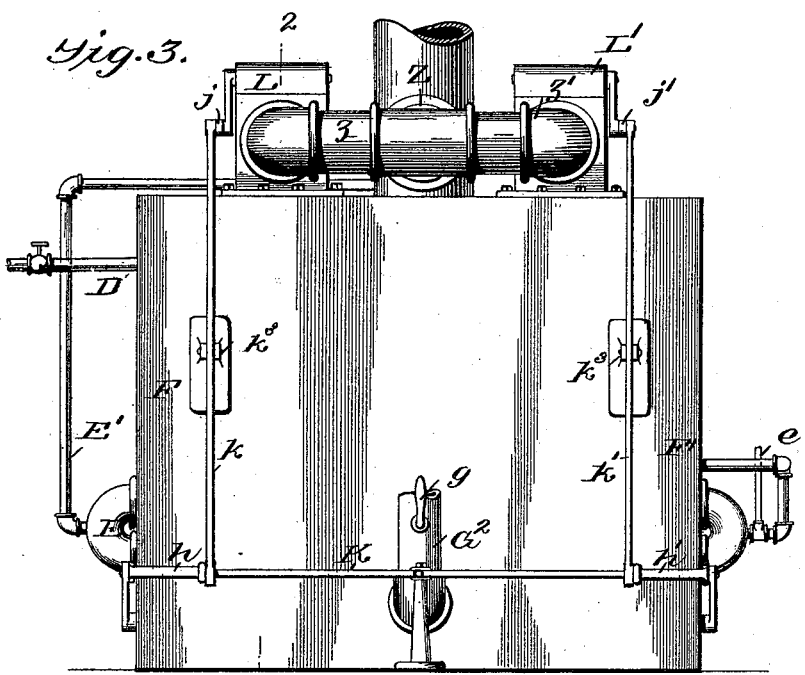

(No Model.) 3 Sheets—Sheet 1.
A. M. HAY & J. B. ARCHER.
COMBINED GAS PRODUCING AND AIR HEATING APPARATUS.
No. 582,529. Patented May 11, 1897.
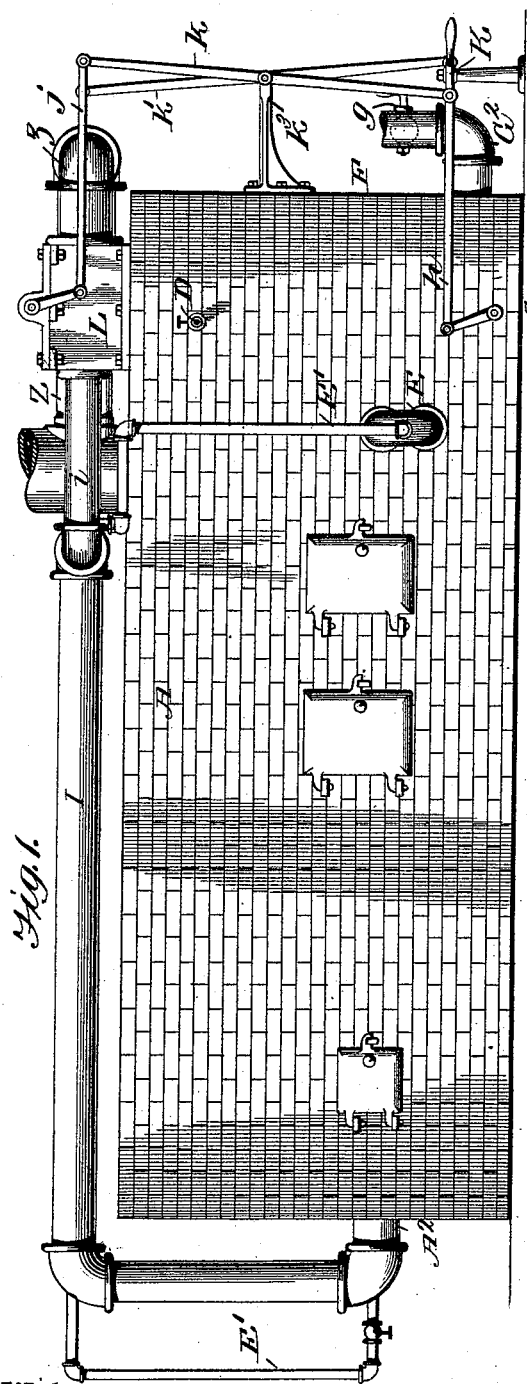
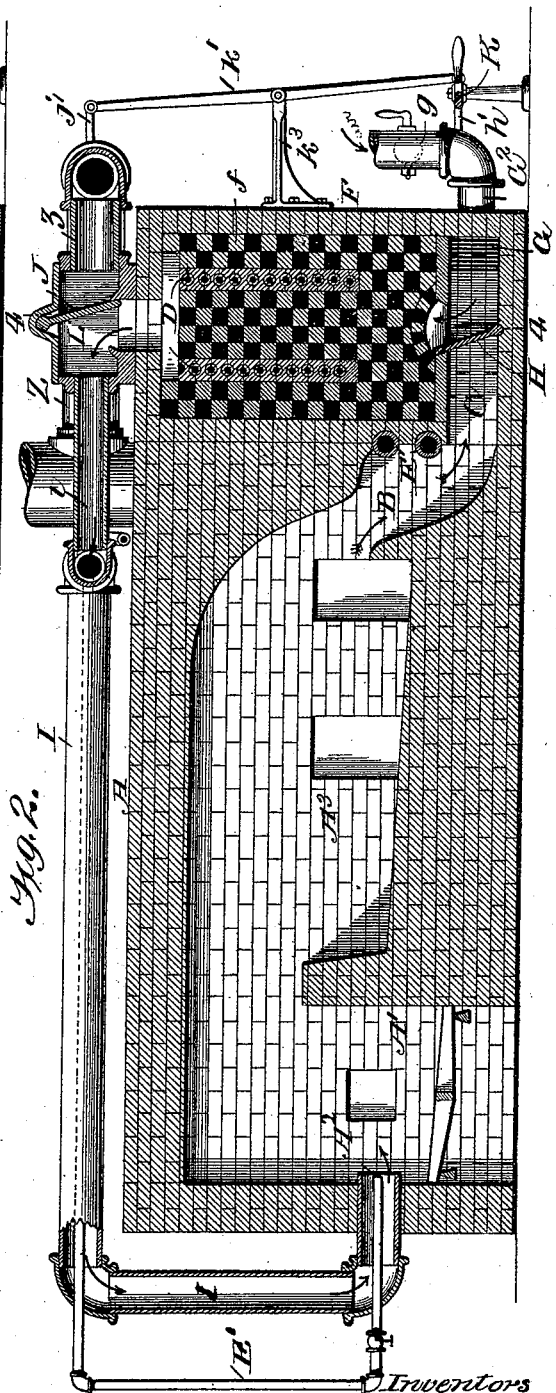
Witnesses
Jos. C. Stack
James R. Mansfield
Inventors
Alexander M. Hay and
John B. Archer
By Alexander Howell Attys (No Model.) 3 Sheets—Sheet 2.

A. M. HAY & J. B. ARCHER.
COMBINED GAS PRODUCING AND AIR HEATING APPARATUS.

No. 582,529. Patented May 11, 1897.

Witnesses.
Jos. C. Stack.
James R. Mansfield

Inventors
Alexander M. Hay and
John B. Archer (No Model.) 3 Sheets—Sheet 3.

A. M. HAY & J. B. ARCHER.
COMBINED GAS PRODUCING AND AIR HEATING APPARATUS.

No. 582,529. Patented May 11, 1897.

Witnesses
Jos. C. Stack
James R. Mansfield

Inventors
Alexander M. Hay
and John B. Archer
by Alexander Howell
Att'ys

UNITED STATES PATENT OFFICE.

ALEXANDER MARSHALL HAY, OF DULUTH, MINNESOTA, AND JOHN BURCH ARCHER, OF WASHINGTON, DISTRICT OF COLUMBIA, ASSIGNORS OF ONE-HALF TO JOHN HAY, OF LONDON, ENGLAND.

COMBINED GAS-PRODUCING AND AIR-HEATING APPARATUS.

SPECIFICATION forming part of Letters Patent No. 582,529, dated May 11, 1897.

Application filed April 24, 1896. Serial No. 588,954. (No model.)

*To all whom it may concern:*

Be it known that we, ALEXANDER MARSHALL HAY, of Duluth, St. Louis county, Minnesota, and JOHN BURCH ARCHER, of Washington, District of Columbia, have invented certain new and useful Improvements in a Combined Gas-Producing and Air-Heating Apparatus for Furnaces; and we do hereby declare that the following is a full, clear, and exact description thereof, reference being had to the accompanying drawings, and to the letters of reference marked thereon, which form part of this specification.

This invention is an improvement in metallurgical and other furnaces, such as are used for heating and melting iron and steel, roasting and smelting ores, making cement, &c., and is especially designed for such furnaces when fired by gas; and the principal object of this invention is to utilize the surplus or waste heat of the products of combustion (which ordinarily are allowed to escape into the atmosphere) in the production and combustion of the gaseous fuel for the furnace.

By our invention the gas is generated by the heat of the waste products of combustion and supplied in a highly-heated condition to the combustion-chamber of the furnace together with hot air (which is also heated by the waste products of combustion) or hydrogenous gases or mixtures thereof with air, so that we practically establish an endless cycle of hot air and gases through the furnace and gas-making apparatus back to the furnace, with this important distinction, however, that we only supply fresh air and gases to the furnace, permitting the products of combustion therein, after depriving them of their useful heat, to escape into the atmosphere.

This invention is especially designed and adapted for application to furnaces having but a single primary combustion-chamber or where the products of combustion flow continually from one end, the object being to increase the efficiency of such furnaces by combining with them a modification of the regenerative apparatus for heating gas and air, using such apparatus to manufacture gas or gaseous mixtures and to liberate hydrogen gas to be used in operating the furnace itself and for other purposes.

The invention can be adapted to various kinds of furnaces, but it is especially valuable in its application to furnaces where a continuous, intense, and rapid current of heat is required to pass through them and in which ordinarily a large percentage of the useful heat in the fuel unavoidably passes away as surplus or waste heat, for which reason the efficiency and capacity of such furnaces, from an economic standpoint, are limited to the extent to which such surplus heat can be advantageously utilized for such purposes as heating air, superheating steam, raising steam under boilers, &c.

By our invention we not only utilize the ordinarily-wasted heat, but increase the amount of heat passing through the furnaces to such an extent as to render a sufficient amount of surplus heat available for the manufacture of gas and liberation of hydrogen as well as for the purpose of heating air, superheating steam, &c., as hereinafter described, thereby, from an economic standpoint, increasing the efficiency and capacity of the furnace at a less proportionate cost for fuel.

The accompanying drawings show the invention applied to a heating or melting furnace of the ordinary reverberatory type.

Featherless arrows represent air, and feathered arrows represent surplus heat from the furnace and indicate the direction in which the same are passing through the apparatus, as hereinafter described.

Figure 4:
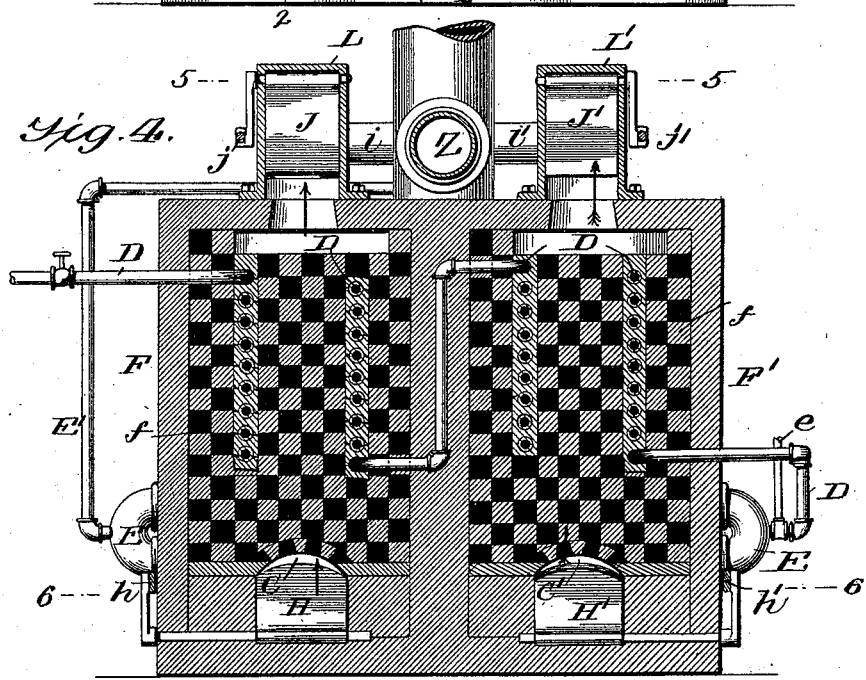
Figure 5:
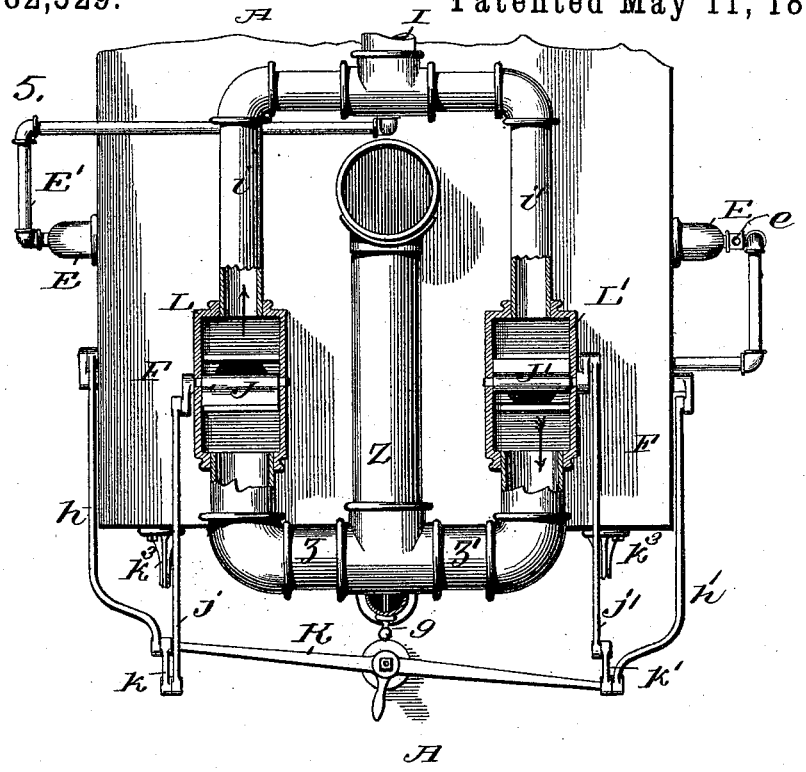
Figure 6:
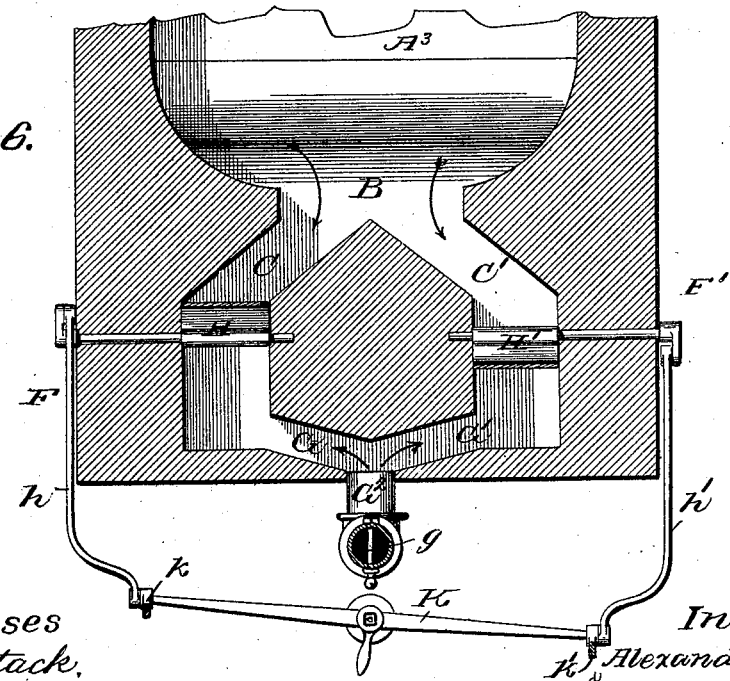

Figure 1 is a side elevation of the furnace. Fig. 2 is a longitudinal vertical section of the same on line 2 2, Fig. 3. Fig. 3 is a rear end elevation of the gas-making portion of the apparatus. Fig. 4 is an enlarged vertical transverse section on line 4 4 on Fig. 2. Fig. 5 is a sectional view on the horizontal line 5 5, Fig. 4. Fig. 6 is a horizontal sectional view on the horizontal line 6 6 on Fig. 4, showing the ground plan and arrangement of lower flues and valves.

A represents an ordinary reverberatory furnace having a fire-chamber A', in which is arranged a gas-burner $A^2$ of any suitable construction, and a combustion or reducing chamber $A^3$, in which the ores to be roasted or whatever is to be subjected to the action of the hot combusting gases is placed. From chamber $A^3$ the burned gases pass down through a flue B into one or the other of a pair of flues C C', which respectively lead the gases into the lower ends of a pair of heat-absorbing chambers F F', which are filled with checker-work $f$ of any suitable construction to absorb the heat of the waste gases flowing therethrough. The flues C C' are valved, as shown and hereinafter described, so that the waste gases can flow through but one chamber at a time, and while one chamber is being heated the other is utilized to heat air or liberate hydrogen from steam, as hereinafter described. In this respect the apparatus resembles a regenerative furnace, but the chambers are heated alternately by the flow of waste gases, which is supplied from the furnace proper and always flows through the chambers in the same direction and not from one chamber to the other, as they would do in a regenerative furnace of the ordinary type.

Within the checker-work in each chamber is placed a coil D, which may be utilized for superheating steam, and the coils may be connected in series so that the steam will pass through both. Athwart the chambers and lying in such position as to be subjected to the intense heat of the inflowing hot products of combustion is a retort E of any suitable construction, with which the steam-coils connect, as shown, and oil may be introduced into the retort along with the steam through a pipe $e$, as indicated in the drawings. From this retort the gases are conducted off by a pipe E'.

Air can be supplied to the lower ends of chambers F F' through passages G G', respectively, communicating with an air-inlet pipe $G^2$, provided with a regulating-valve $g$, as shown.

Passage G is opposite flue C, and passage G' opposite flue C', (see Figs. 2 and 6,) but communication therebetween is prevented by any suitable arrangement of valves.

As shown, flap-valves H H' are located just beneath the chambers F F', respectively, and so constructed that when turned in one direction they will close the flue under one chamber and open the flue under the other chamber and simultaneously close the air-passage under the latter chamber and open the air-passage under the former chamber. Thus both air-passages and both flues are controlled by one pair of valves, and these valves are connected so that they are operated synchronously. Consequently air products cannot simultaneously traverse the same chamber F or F', but when air traverses one, products traverse the other. A similar arrangement by any suitable construction of air and waste-product passages is made at the exit ends of the chambers.

As shown, chamber F communicates at top with outlet-flue Z by a pipe $z$, and with a pipe I by a short pipe $i$; but a valve J is hung over the outlet from chamber F in such manner that when swung to one side it shuts off communication with pipe $i$ and opens communication with the flue, and vice versa when swung to the other side.

Chamber F' communicates with outlet Z by a pipe $z'$, and with pipe I by a pipe $i'$, but cannot communicate simultaneously with both because of a valve J', which is arranged to operate as and for the purpose of valve J. The valves J J' are hung in suitable boxings L L', as shown.

The pipe I leads back into the fire-chamber of the furnace and supplies hot air thereto, and the gas-pipe E', if desired, may be led back through pipe I to the furnace to supply the gaseous fuel to burner $A^2$.

The valves H H', as shown, are connected by rods $h\ h'$ to the opposite ends of a horizontal lever K, which is centrally fulcrumed on a suitable support in rear of the chambers, and valves J J' are connected by rods $j\ j'$ to the upper ends of levers $k\ k'$, fulcrumed on brackets $k^3$, attached to the walls of the furnace, as shown, the lower ends of levers $k\ k'$ being connected in any suitable manner with the opposite ends of lever K, respectively, so that the valves H H' and J J' are all operated simultaneously in the proper direction when it is desired to shift the flow of the products of combustion from one heat-absorbing chamber to the other.

We do not confine ourselves to the particular construction or operation of the valves herein shown and described.

By the arrangement of cross-bar levers and rods the valves are so operated that the surplus heat from the furnace is free to pass along one of the flues C or C' up through one of the heat-absorbing or regenerative chambers F or F', which is designed to absorb and retain the surplus heat, and the waste products of combustion and terminal gases of no value are allowed to escape through the flue-pipe Z or Z' to the smoke-stack. At the same time that this operation is progressing in one chamber air from the pipe G' is free to pass along one of the Y-shaped air-ducts G or G' up through the other regenerative chamber, thence through the hot-air pipes to the mouth of the furnace or elsewhere, as may be desired. This double operation is alternated from chamber to chamber by reversing the valves, (by means of the cross-bar levers, as already described,) whereby a continuous flow of surplus heat from the furnace is made to pass into one or other of the regenerative chambers and there absorbed, while at the same time a continuous flow of air under suitable pressure is established through the other chamber (reabsorbing a portion of the heat therein retained) and on to the mouth of the furnace. Thus a constant supply of heat is rendered available in the regenerative chambers for the manufacture of gas, while at the same time a constant supply of hot air is rendered available for the combustion of the fuel used in the operation of the furnace or for use elsewhere, as may be desired.

When air to sustain combustion in the furnace is obtained from other sources, the operation of passing air through the regenerative chamber may be varied by passing steam or superheated steam or a mixture of air and steam through the air-duct into the regenerative chamber in which the surplus heat has been stored, thereby liberating a portion of the hydrogen in the steam and forming a gaseous mixture of great heating value, which is made to pass on through the hot-air pipes to the mouth of the furnace or elsewhere, as may be desired.

The operation of making gas or gaseous fuel from liquid hydrocarbons in connection with this system is as follows: Steam from any available boiler is passed into and through the steam-coils D, wherein it is highly superheated. It is then led to the retort E. At or before the point of entering the retort the superheated steam is brought into contact with oil, which is immediately decomposed, and certain well-known chemical reactions take place, resulting in the manufacture of water-gas, which is more or less permanent and highly carbureted, according to the amount of oil injected with the superheated steam and the degree of heat to which they are subjected in the retort. From retort E the gas is led through pipe E' to the mouth of the furnace or elsewhere and brought into contact with the superheated air wherever combustion is desired.

As the superheating of steam and air and the manufacture of gas and gaseous mixtures in the above apparatus are effected by means of waste and surplus heat, it is evident that the efficiency and capacity of the furnace can be greatly increased, as higher temperatures can be maintained therein, and, as the operations in the furnace and in the gas-maker are under easy control and have a direct bearing one on the other, the manufacture and combustion of gases may be regulated and maintained at such a point as may be most desirable for the character of the operation on hand in the furnace.

The above-described method and devices for operating the system may be varied to meet the requirements of different furnaces, or the apparatus may be run entirely for the purpose of heating or superheating air or steam, and it may be operated in connection with the furnaces using coal, wood, or any any other kind of fuel, or it may be operated for the purpose of liberating hydrogen from steam by alternately passing steam instead of air through pipe $G^2$ into the regenerative chambers F F'.

If the apparatus is used solely to manufacture gas or gaseous mixtures from the surplus or waste heat, as above described, only one regenerative chamber need be used, or it may be used for the purpose of manufacturing illuminating-gas by passing the gas or gaseous mixtures obtained in the retort or mixing-chamber E into the regenerative chambers, either together or separately or alternately, for the purpose of fixing the gas to render it suitable for heating or illuminating purposes.

We have now described our system for the manufacture of gas and gaseous mixtures by waste and surplus heat from furnaces, &c., and devices showing how it can be applied. Other forms of apparatus and devices may be used for accomplishing the same result, but we preferably use the apparatus and devices above described with such modifications as we find it necessary or desirable to make in adapting and applying the system to different kinds of furnaces and work.

An important feature of the invention is that the combustion of the gas or gaseous mixtures in the furnace is increased to an amount that will supply sufficient surplus heat for its own production or manufacture, thereby increasing the efficiency or productive capacity of the furnace not only without loss, but actually with a net gain in economy of fuel used. Under ordinary methods where the manufacture of gas is the initiative step to its combustion a large proportion of the calorific value of the fuel is absorbed and lost in the operation of rendering available its effective heat. Under the system above described this latter operation is practically reversed, the operation of manufacturing gas being a subsidiary step to its combustion.

The very important feature of our invention is that we are enabled to change the chemical character of the heat or gas from high in hydrogen to a reducing heat low in hydrogen and high in carbon, especially useful in smelting ores.

Having thus described our invention, what we claim as new, and desire Letters Patent thereon, is—

1. In an apparatus of the character described, the combination of a furnace for utilizing heat in the useful arts, having a combustion-chamber at one end and an outlet at the other end; a gas-making and air-heating apparatus at the exit end of the working chamber, traversed and heated by the waste gases, consisting of a pair of similar regenerative chambers; valves whereby the products of combustion can be alternately sent through the chambers, means for supplying air to either chamber when the gases are traversing the other chamber; a retort in a position to be subjected to the heat of the outflowing products of combustion, and steam-superheating coils in the chambers communicating with said retort; with means for conducting the heated air from either chamber and the hot gases produced in said retort back to the furnace to maintain combustion therein, all substantially as and for the purpose specified.

2. The combination of a furnace for utilizing the heat of combustion therein substantially as specified, and an apparatus at the exit end of said furnace heated by the terminal gases therefrom, comprising a pair of similar chambers respectively adapted to communicate with the furnace and the uptake, a gas-making retort in position to be subjected to the heated outflowing gases and a steam-heating coil in each chamber communicating with said retort; with means for causing the current of hot terminal gases from the furnace to traverse either chamber of said apparatus; means for passing air to that chamber of said apparatus not traversed by the products of combustion; and means for conducting the heated air and unburned gases to the combustion-chamber of the furnace; whereby continuous currents of fresh gases and heated air are supplied to the furnace, and the surplus products of their combustion utilized to produce fresh gases, heated air, &c., substantially as and for the purpose specified.

3. In an apparatus of the character described, the combination of a furnace for utilizing heat in the arts, substantially as described, and a pair of similar regenerative chambers at the exit end of the furnace through which the terminal waste gases are passed; a gas-making retort in position to be heated by said waste products; a steam-coil in each chamber communicating with said retort, and valves for causing the terminal gases to traverse the chambers alternately; with valves whereby air is supplied to that chamber of the apparatus not traversed by the terminal gases; and means for conducting the hot unburned gas and air from the chambers to the furnace to support combustion therein, all substantially as and for the purpose described.

4. The combination of a furnace having a combustion-chamber at one end and outlet-flues at the other; a pair of similar regenerative chambers at the exit end of the furnace, each having a steam-superheating coil; and a gas-retort in position to be heated by the waste gases, and communicating with said steam-coils; with a system of valves and passages substantially as described whereby the products of combustion may be directed through either chamber of the apparatus; while simultaneously air is directed through the other chamber, substantially as and for the purpose described.

5. The combination of a furnace having a combustion-chamber at one end and an outlet at the other end, a pair of similar heat-absorbing chambers, each communicating at one end with the exit of said combustion-chamber, and at the other end with the outlet-flue; an air-supply communicating with one end of the absorbing-chambers, and a pipe connecting the other ends of the absorbing-chambers with the inlet end of the combustion-chamber of the furnace to supply hot air thereto; steam-heating pipes in each chamber, a gas-retort in a position to be heated by the waste products of combustion; and connections between the retort and steam-coils with a system of valves substantially as described, whereby the waste products of combustion are caused to pass alternately through either absorbing-chamber and simultaneously air is passed through the other absorbing-chamber to the furnace; and means for conducting gas generated in said retort to the furnace, all substantially as and for the purpose described.

6. The combination of a furnace, a pair of regenerative chambers at the exit end thereof, a retort in position to be heated by the waste products of combustion, and a steam-heating coil in each chamber communicating with said retort and an oil-supply for the retort; with means substantially as described for directing products of combustion from the furnace alternately through the said chambers and at the same time passing air through the chamber not being traversed by the products of combustion, and means for conducting the air thus heated and the gas generated in the retort to the combustion-chamber of the furnace where it is mixed and consumed with the gas; whereby a constant supply of fresh-heated gas and heated air is introduced into the combustion-chamber of the furnace, and the products of combustion flowing continually through and from the furnace and chambers into the atmosphere are caused to generate the gas and heat the air, substantially as and for the purpose described.

In testimony that we claim the foregoing as our own we affix our signatures in presence of two witnesses.

ALEXANDER MARSHALL HAY.
JOHN BURCH ARCHER.

Witnesses to the signature of Alexander Marshall Hay:
   VIRGIL W. BLANCHARD,
   ARTHUR E. DOWELL.

Witnesses to the signature of John Burch Archer:
   F. W. ELLIS,
   H. W. BRIGGS.